United States Patent
Böhm

(10) Patent No.: US 6,543,902 B2
(45) Date of Patent: Apr. 8, 2003

(54) OUTSIDE REARVIEW MIRROR FOR A MOTOR VEHICLE

(75) Inventor: Karl-Heinz Böhm, Unterleinleiter (DE)

(73) Assignee: Bühler Motor GmbH, Nurnberg (DE)

( * ) Notice: Subject to any disclaimer, the term of this patent is extended or adjusted under 35 U.S.C. 154(b) by 0 days.

(21) Appl. No.: 09/926,338

(22) PCT Filed: Feb. 15, 2001

(86) PCT No.: PCT/DE01/00610

§ 371 (c)(1), (2), (4) Date: Jan. 10, 2002

(65) Prior Publication Data

US 2002/0141084 A1 Oct. 3, 2002

(30) Foreign Application Priority Data

Feb. 16, 2000 (DE) .......................................... 100 06 913

(51) Int. Cl.$^7$ ............................. G02B 5/08; G02B 7/18
(52) U.S. Cl. ....................... 359/841; 359/877; 248/900
(58) Field of Search ................................ 359/841, 871, 359/872, 877, 881; 248/475.1, 476, 479

(56) References Cited

U.S. PATENT DOCUMENTS

| 5,781,354 A | * | 7/1998 | Sakata | ......................... 248/549 |
| 6,022,113 A | | 2/2000 | Stolpe et al. | |
| 6,322,221 B1 | * | 11/2001 | van de Loo | ................. 248/479 |
| 6,390,630 B1 | * | 5/2002 | Ochs | .......................... 248/478 |

FOREIGN PATENT DOCUMENTS

| DE | 198 13 039 | 10/1999 |
| WO | WO 91/04172 | 4/1991 |
| WO | WO 97/43144 | 11/1997 |

* cited by examiner

Primary Examiner—Mark A. Robinson
(74) Attorney, Agent, or Firm—Jacobson Holman PLLC

(57) ABSTRACT

The invention relates to an outside rearview mirror for a motor vehicle. Said rearview mirror comprises a mirror base, to be attached to the motor vehicle; a mirror head, which carries a mirror glass. The invention also relates to a self-blocking drive, arranged in a multipart drive housing, with an electric motor, whose output shaft is in engagement in gear with a reduction gear and/or can be folded and moved back out of the service position (F to P) about a swivel axis and hinged to the motor vehicle under the effect of an external force; and the invention relates to electromechanical or electronic means, detecting a relative movement. In a known servo drive of this type, time consuming installation steps must be performed. Therefore, the object of the present invention is to enable a relatively arbitrary number of ways to lead the motor connections out and to enable the motor to move out of a blocked position while the installation remains simple. The invention solves this problem in that the drive can be connected electrically by means of a first plug socket, which is a component of a first part of the drive housing, and the electromechanical or electronic means can be connected by means of a second plug socket, which is a component of a second part of the drive housing, to a control unit in the motor vehicle. Thus, the first plug socket is connected electrically to the electric motor by means of the first guide plates; and the second plug socket is connected electrically by means of the second guide plates to the electromechanical or electronic means. The first plug socket can be installed with respect to the second plug socket in a plurality of different positions; and the guide plates between the first plug socket and the electric motor are flexible in the axial direction of the electric motor.

18 Claims, 6 Drawing Sheets

OUTSIDE REARVIEW MIRROR FOR A MOTOR VEHICLE

DESCRIPTION

The invention relates to an outside rearview mirror for a motor vehicle. Said rearview mirror comprises a mirror base, to be attached to the motor vehicle; a mirror head, which carries a mirror glass and can be swivelled about a swivel axis and which can be driven by a self-blocking drive, which is arranged in a multipart drive housing. Said drive comprises an electric motor, which can be slid slightly in the axial direction axially with respect to the drive housing and whose output shaft engages in gear with a reduction gear, whose output gearwheel is held in engagement with the mirror base by means of unlockable locking means under the force effect of a compression spring, whereby the mirror head can be folded out of a service position (F to P) about the swivel axis and hinged to the motor vehicle under the effect of an external force, whereby the mirror head can be moved along with the unlockable locking means and,can perform, thus, with respect to the mirror base a relative displacement along the swivel axis. Said displacement is detected by electromechanical or electronic means, arranged in the drive housing, and the motor connections can be led out of this drive housing at a plurality of different places on a peripheral line of the drive housing.

In a known outside rearview mirror of the aforementioned class, the electromechanical or electronic means and the motor connections are soldered or crimped to the stranded conductors, which are led through the drive housing to the outside. These stranded conductors are part of a cable harness, which connects other electric consuming devices in the outside mirror to the electrical system of the motor vehicle. For engineering reasons, the electromechanical or electronic means are disposed in a relatively inaccessible place inside the drive housing and their connections are at a distance from the connections of the electric motor. Therefore, the cost of installing the components, which have been already previously soldered or crimped to the cable harness, into the drive housing is relatively high. To facilitate the startup of the electric motor from a blocked position, the prior art outside rearview mirror exhibits an electric motor that is slightly moveable in the axial direction. Owing to the moveable electric motor the motor shaft can be accelerated first, before the gear unit has to be actuated. For flexibility reasons it should be possible to lead the connections for the electric motor out of said drive housing at a plurality of places on a circumference about the drive housing. Should, in addition to the motor, electromechanical or electronic means be connected, a plug solution is poor.

Therefore, the object of the present invention is to design an outside rearview mirror of the aforementioned class in such a manner that there are a relatively arbitrary number of ways of leading out the motor connections, while it remains possible to move reliably out of a blocked position, and yet it is easy to assemble the said outside rearview mirror.

The invention solves this problem in that the drive can be connected electrically by means of a first plug socket, which is a component of a first part of the drive housing, and the electromechanical or electronic means can be connected by means of a second plug socket, which is a component of a second part of the drive housing, to a control unit in the motor vehicle. Thus, the first plug socket is connected electrically to the electric motor by means of the first guide plates; and the second plug socket is connected electrically by means of the second guide plates to the electromechanical or electronic means. The first plug socket can be installed with respect to the second plug socket in a plurality of different positions; and the guide plates between the first plug socket and the electric motor are flexible in the axial direction of the electric motor. Owing to the use of the two plug sockets, there is no need for an expensive cable connection between the electric motor and the electromechanical or electronic means, thus significantly simplifying the assembly. Owing to the flexible guide plates it is also possible for the electric motor to move in the axial direction when the plug sockets are used. This arrangement allows the electric motor to start reliably from a blocked position. Owing to the arrangement of the plug sockets on different drive housing components, it is possible to lead the motor connections out of the drive housing in an almost arbitrary number of ways. The plug position for the electromechanical or electronic means is stationary.

Other advantageous variants of the invention are disclosed in detail in the dependent claims.

A plurality of positions between the first plug socket and the second plug socket are possible by providing a gear tooth system, whose pitch defines the number of positions, between the drive housing part, which is made as one piece with the plug socket, and another part of the drive housing.

The use of a rim gear tooth construction between the first part of the drive housing and a third part of the drive housing to ensure that the parts will not rotate makes the production of the parts of the drive housing especially economical, because there is no need to provide any undercuts, which would be a drawback in releasing the shaped parts from the molds, by means of the geometric configuration of the tooth construction.

The parts of the drive housing are easy to assemble because of the snap-on means, which can be snapped on arbitrary positions about the drive housing, whereby they hold the first part of the drive housing at the third part of the drive housing. In so doing, the number of possible positions of the first plug socket is not limited.

A preferred embodiment of the inventions provides four parts of the drive housing, wherein the first part of the drive housing is made as one piece with the first plug socket; the second part of the drive housing is made as one piece with the second plug socket; and a fourth part of the drive housing is connected to the first part of the drive housing by means of a slide connection. This arrangement renders it even simpler to install the electric motor with the first guide plates into the first plug socket by sliding the plug socket sideways onto the guide plates and then installing the motor into the second and third part of the drive housing and finally by installing the fourth part of the drive housing in the axial direction of the motor into the slide connection to the first part of the drive housing and into the toothing and the snap-on means of the third part of the drive housing.

It is expedient for the second part of the drive housing to be also held at the third part of the drive housing by means of snap-on means.

Even with the use of four drive housing parts, it is advantageous, as described above, to have a rim gear tooth construction and a snap-on connection, in this case between the third part of the drive housing and the fourth part of the drive housing.

Advantageously clamping joints are provided for the connection between the guide plates and the electric motor or the electromechanical or electronic means. They are to be made more reliably and environmentally friendlier than soldered joints.

Experience has shown that a microswitch is very well suited as the electromechanical or electronic means to detect the unlocked state.

When using two plug sockets, it is practical to make both of them identical in order to reduce the number of different parts. Furthermore, a polarity reversal protection must be realized by means of a suitable shape of the plug sockets by providing two insides whose width varies. When using two connecting pins per plug socket, simple commercial plugs can be used.

The outside rearview mirror, according to the invention, is characterized primarily by it flexible connecting options. In this respect the two plug sockets (10, 11) can be arranged perpendicularly, parallel or antiparallel to each other.

One embodiment of the invention is explained in detail below with reference to the drawings.

Figure 1:
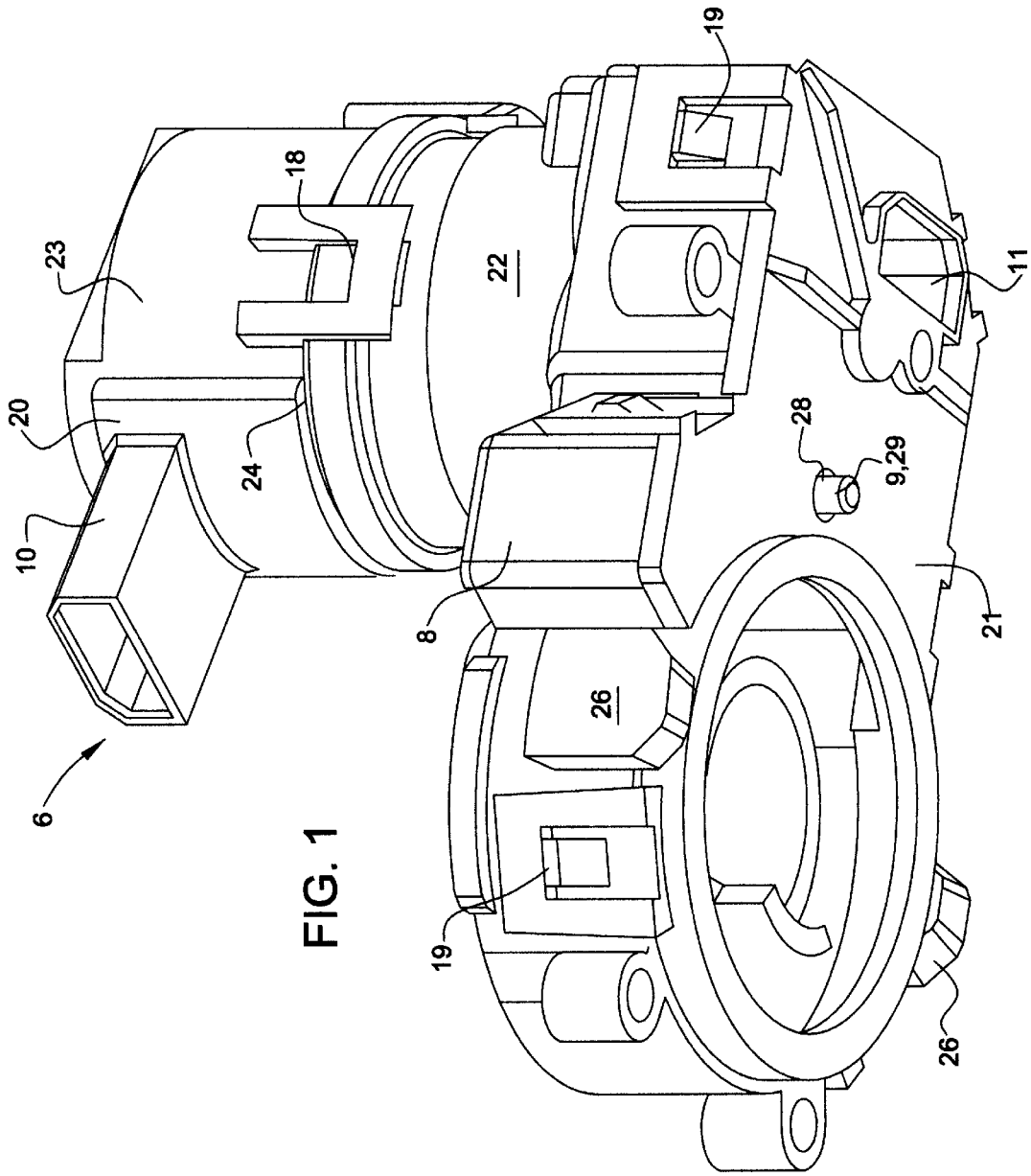
FIG. 1 is a three dimensional drawing of a drive for an outside rearview mirror, according to the invention.

FIG. 1 is a three dimensional drawing of a drive 6 for an outside rearview mirror of the invention. Said drive exhibits a drive housing 8, comprising a first drive housing part 20, which is one piece with a first plug socket 10; a second drive housing part 21, which is one piece with a second plug socket 11. Said drive also exhibits a notch 28 for the passage of electronic means 9, designed as a push button 29; and a third drive housing part 22, which exhibits travel limiters 26, is connected by means of snap-on means 19 to a second drive housing part 21; and a fourth drive housing part 23, which is connected to the first housing part by means of a slide connection 24 and to the third drive housing part 22 by means of snap-on means 18. The first and second plug sockets 10 and 11 can be arranged in almost any arbitrary number of positions in relation to each other. Thus, the drive can be made compatible with different installation conditions. The push button serves to detect a situation, which is induced by an external force acting on the rearview mirror and where the drive and the outside rearview mirror are located in an elevated position.

Figure 2:
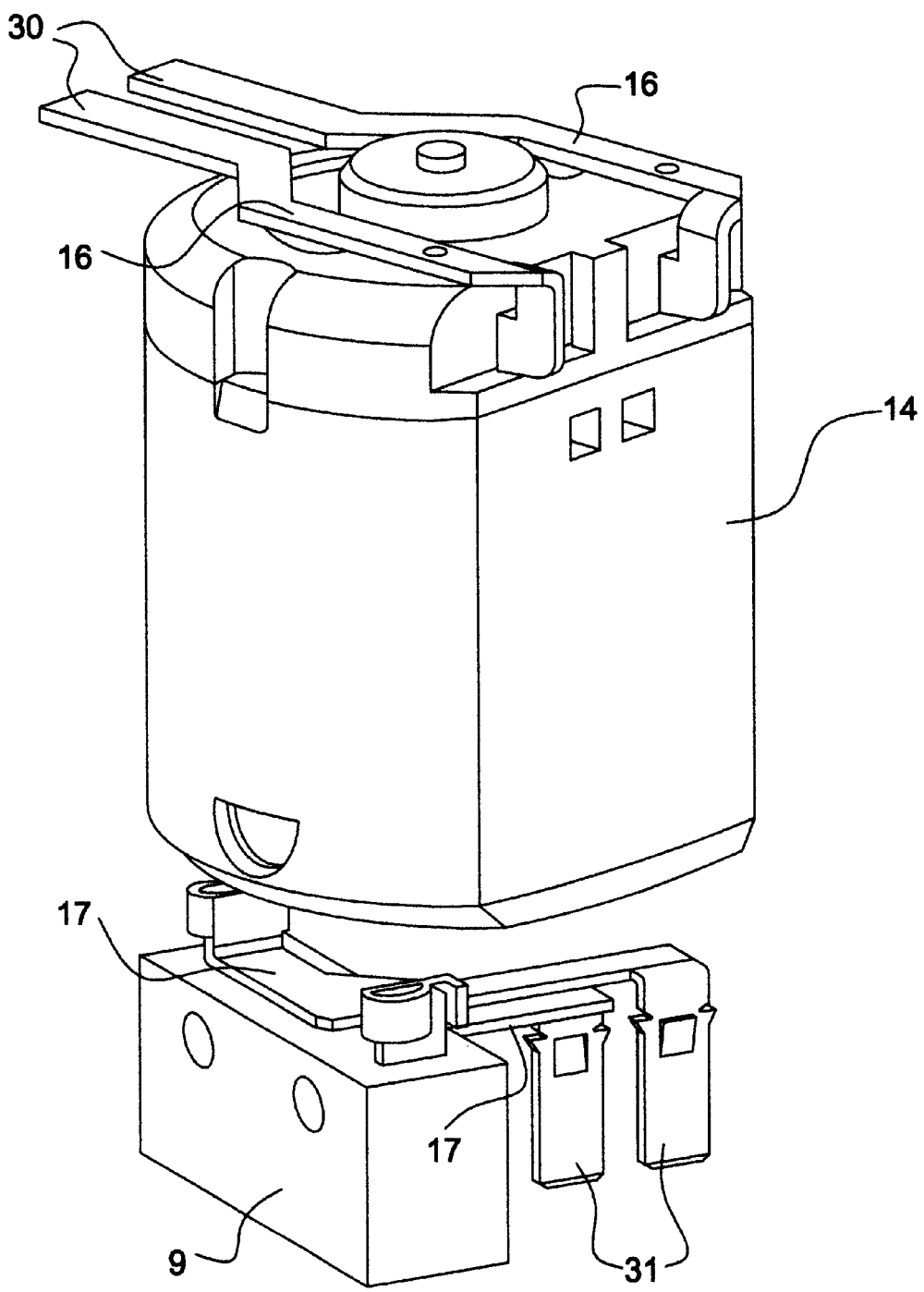
FIG. 2 is a three dimensional drawing of a drive motor and a microswitch.

FIG. 2 shows an electric motor 14 and a microswitch 9 in one of many possible configurations, whereby the electric motor 14 can be installed in different positions about its own axis. Both the electric motor 14 and the microswitch 9 are connected electrically and mechanically to guide plates 16 or 17. One end of the guide plates 16 is connected to the electric motor 14 by plugging in; and the other end serves as the plug lug 30. One end of the guide plates 17 is connected electrically and mechanically to the microswitch 9 by plugging in; and the other end serves as the plug lug 31. The plug lugs 30 are arranged in the first plug socket 10; and the plug lugs 31 are arranged in the second plug socket 11 and are fastened so as to be locked by their shape in a force fit. The guide plates 16 are connected to the electric motor on the side of the electric motor 14 facing away from the plug lugs 30 and the first plug socket 10. The result is a larger spring arm so that the electric motor 14 remains slightly moveable in the axial direction. Another advantage is the substantially longer creep distance for moisture; this applies analogously to the guide plates 17.

Figure 3:
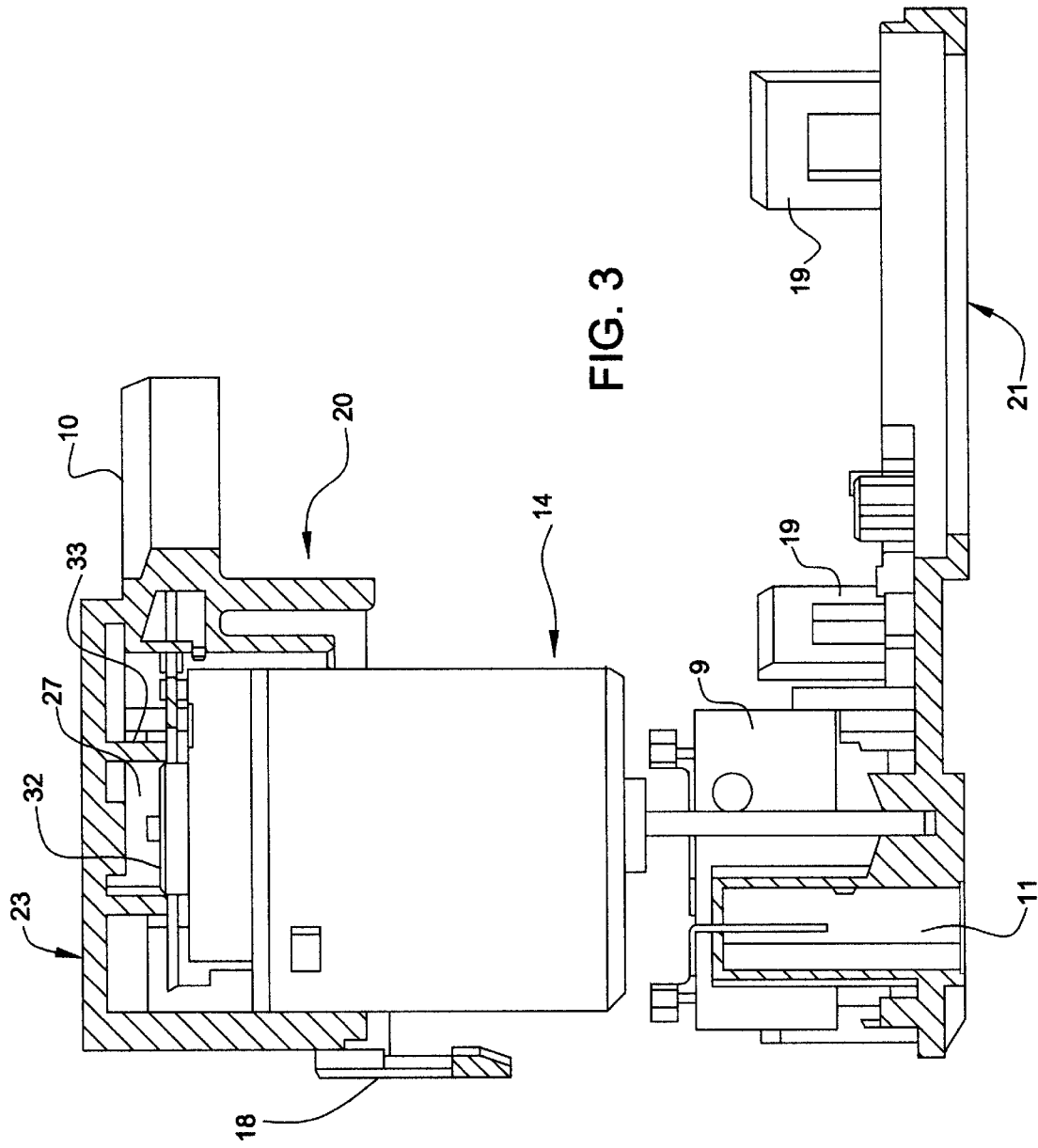
FIG. 3 is a sectional drawing of a part of the drive.

FIG. 3 is a sectional view of the electric motor 14, the first drive housing part 20 with the first plug socket 10, the second drive housing part 21 with the second plug socket 11 and snap-on means 19 and the fourth drive housing part 23 with the snap-on means 18. Between the electric motor 14 and the fourth drive housing part 23 there is a clearance 27 so that at startup the electric motor 14 can move slightly in the axial direction in order to facilitate startup. A motor connection 32 of the electric motor 14 is held radially in a notch 33 in the fourth drive housing part 23.

Figure 4:
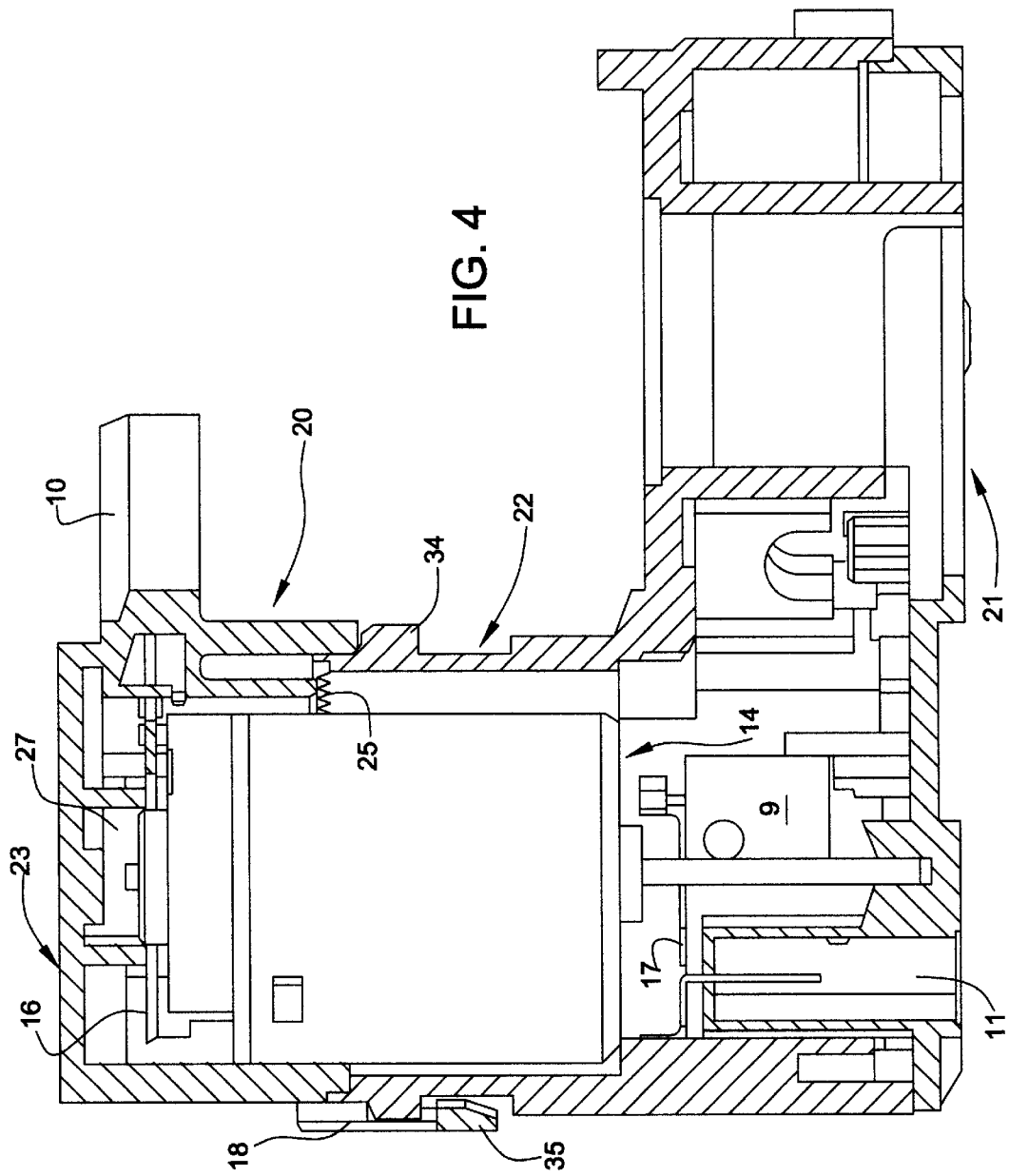
FIG. 4 is a sectional drawing of a drive (without gearbox).

FIG. 4 depicts the same sectional view as in FIG. 3, here with all of the drive housing parts 20, 21, 22 and 23. The electric motor 14 is connected to the first plug socket 10 by means of the guide plates 16; and the microswitch 9 is connected by means of the guide plates 17 to the second plug socket 11. The snap-on means 18 comprise a rigid snap ring 34 and elastic snap noses 35. The snap-on means 18 enable any arbitrary position of the drive housing parts 20 and 23 about the motor axis and in relation to the drive housing parts 21 and 22 and between the first and second plug sockets 10 and 11. The number of positions is limited only by the pitch of the rim gear teeth 25 between the third drive housing part 22 and the fourth drive housing part 23.

Figure 5:
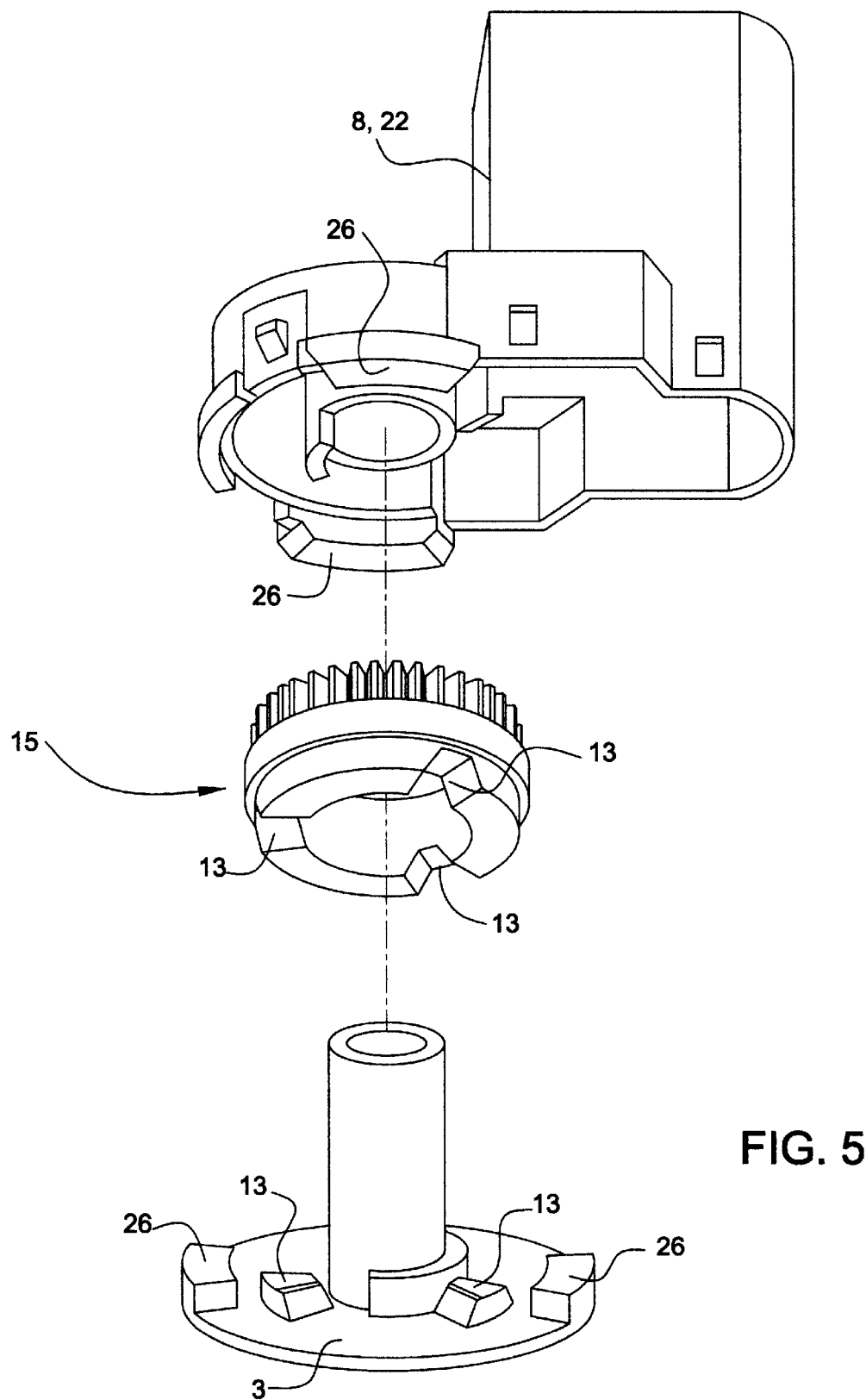
FIG. 5 is an exploded drawing of parts of the drive.

FIG. 5 is an exploded drawing of parts of the drive, with the third drive housing part 22, a part of the reduction gear 15 in the form of a worm wheel and a mirror base 3, which is connected stationarily to the body of a motor vehicle. The reduction gear 15 is a two step worm gear, which is designed so as to self-block. The illustrated worm wheel exhibits locking means 13 in the form of locking notches, which in the assembled state are locked with locking means 13 in the form of locking cams on the mirror base 3 between a drive and a park position. The locking means are provided on the sides with slopes, which allow the locking means to unlock when an external force acts on the mirror. For the same reason the travel limiters 26 are also provided with slopes, which make it possible to unlock in one of the coupling positions, drive or park position. In this case there is relative motion between the drive housing 8 of the drive and the mirror base 3 along a swivel axis of the outside rearview mirror. This relative motion can be detected by the microswitch 9, which is designed as a push button, because it is driven by the mirror base 3 only in the locked state of the locking means between the mirror base 3 and the worm wheel of the reduction gear 15.

Figure 6:
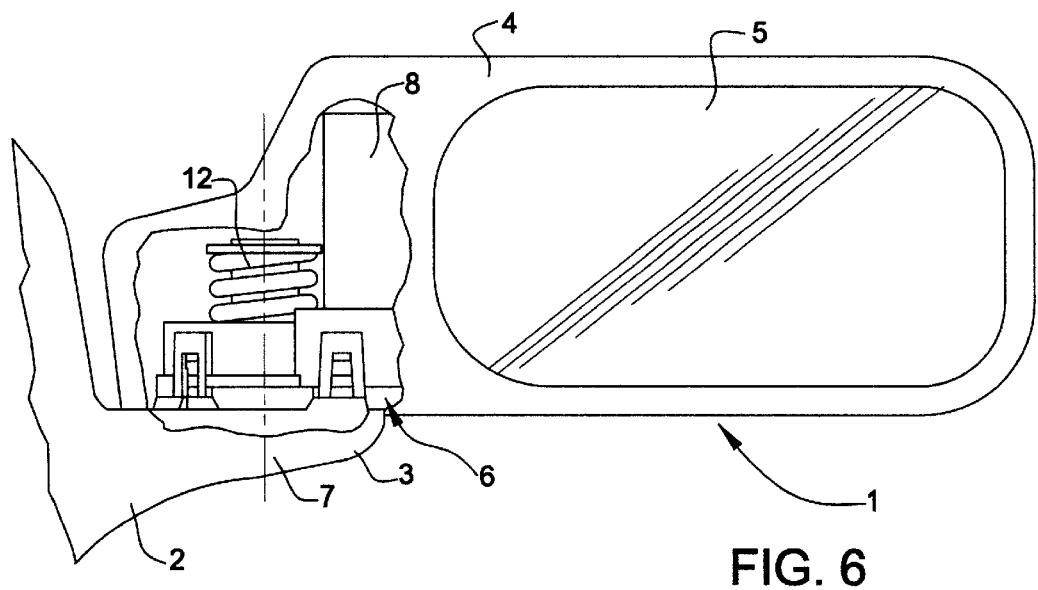
FIG. 6 is a view of the outside rearview mirror.

FIG. 6 depicts an outside rearview mirror 1 with a mirror glass 5, a mirror head 4, to which the drive 6 is stationarily connected, while it is locked to the mirror base 3 under the force of a compression spring 12. The outside rearview mirror can be swivelled about the swivel axis 7 by means of a motor and by means of a force acting on the mirror head 4 from the outside. When adjusting by means of a motor, the locking means 13 remain in the locked state, whereas they unlock owing to the self-locking reduction gear 15, when an external force acts on the mirror head 4. During the unlocking action, the mirror head 4 moves with respect to the mirror base 3 against the force of the compression spring in the direction of the swivel axis and slides over the slopes of the locking means 13 and the travel limiters 26. The mirror base 3 is connected stationarily to the motor vehicle 2.

Figure 7:
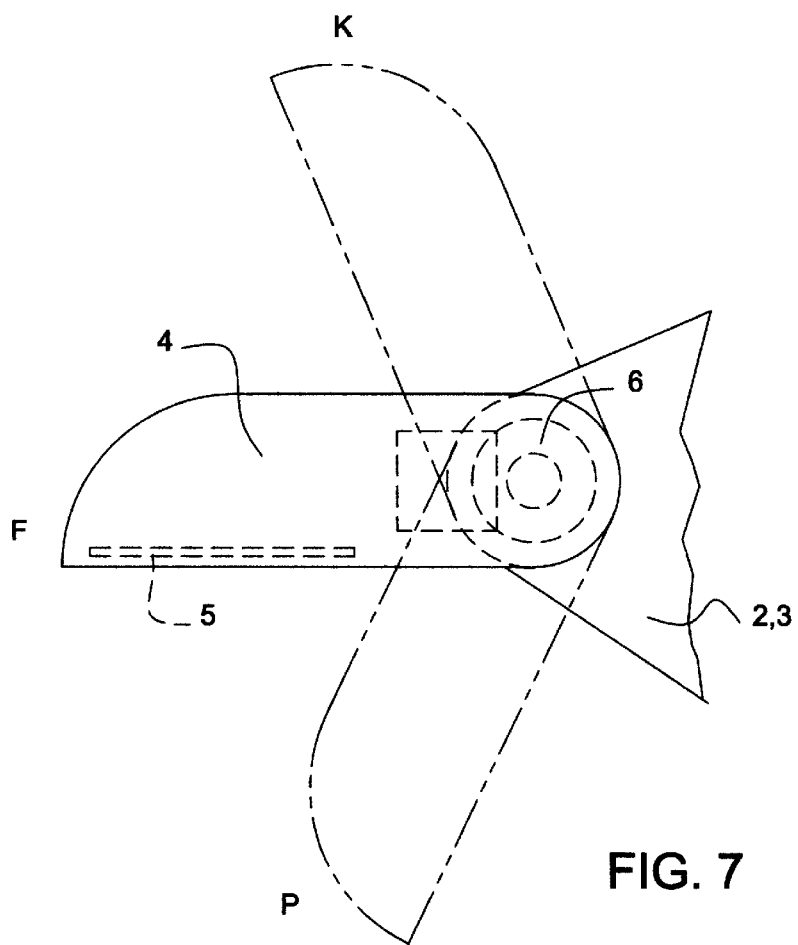
FIG. 7 is a drawing of possible positions of the outside rearview mirror.

FIG. 7 shows the possible positions of the outside rearview mirror. The mirror head 4 can be moved by means of a motor between the drive position F and the parking position P. Owing to an external force the mirror head 4 can also reach a position K in the direction of travel or an intermediate position. The mirror glass 5 can usually be moved by means of an additional drive about two axes, which are perpendicular to each other.

LIST OF REFERENCE NUMERALS

| | |
|---|---|
| 1 | outside rearview mirror |
| 2 | motor vehicle |
| 3 | mirror base |
| 4 | mirror head |
| 5 | mirror glass |
| 6 | drive |
| 7 | swivel axis |
| 8 | drive housing |
| 9 | electromechanical/electronic means |
| 10 | first plug socket (for electric motor) |
| 11 | second plug socket (for electronic means) |
| 12 | compression spring |
| 13 | locking means |
| 14 | electric motor |
| 15 | reduction gear |
| 16 | first guide plates |
| 17 | second guide plates |
| 18 | snap-on means |
| 19 | snap-on means |
| 20 | first drive housing part |
| 21 | second drive housing part |
| 22 | third drive housing part |
| 23 | fourth drive housing part |
| 24 | slide connection |
| 25 | rim gear teeth |
| 26 | travel limiter |
| 27 | clearance |
| 28 | push button |
| 29 | notch |
| 30 | plug lug |
| 31 | plug lug |
| 32 | motor connection |
| 33 | notch |
| 34 | snap ring |
| 35 | snap noses |

What is claimed is:

1. Outside rearview mirror (1) for a motor vehicle (2), comprising:
a mirror base (3), to be attached to the motor vehicle (2):
a multipart drive housing (8) having a first part (20), a second part (21), a first plug socket (10), which is a component of the first part (20), and a second plug socket (11), which is a component of the second part (21);
a mirror head (4) swivellable about a swivel axis (7);
a mirror glass (5) carried by the mirror head (4);
a reduction gear (15) having an output gearwheel;
a compression spring (12);
a self-blocking drive (6) for driving the mirror head (4), the drive (6) being arranged in the multipart drive housing (8), and being connectable electrically to a control unit in the motor vehicle by means of the first plug socket (10) of the first part (20) of the drive housing (8), wherein said drive (6) comprises an electric motor (14) having an output shaft, and motor connections leadable out of the drive housing (8) at a plurality of different places on a peripheral line of the drive housing (8), the electric motor (14) being slidable slightly in the axial direction axially with respect to the drive housing (8) and having an output shaft engaging in gear with the reduction gear (15) and unlockable locking means (13) for holding the output gearwheel in engagement with the mirror base (3) under the force effect of the compression spring (12), whereby the mirror head (4) is foldable out of a service position (F to P) about the swivel axis (7) and hingeable to the motor vehicle (2) under the effect of an external force, whereby the mirror head (4) is movable along with the unlockable locking means (13) and thus, with respect to the mirror base (3) is relatively displaceable along the swivel axis (7);
displacement-detecting means (9) arranged in the drive housing (8) for detecting displacement of the mirror head (4), the displacement-detecting means (9) being electromechanical or electronic and being electrically connectable to a control unit in the motor vehicle by means of the second plug socket (11) of the second part (21) of the drive housing (8);
first guide means (16) for connecting the first plug socket (10) to the electric motor (14), the first plug socket (10) being installable with respect to the second plug socket (11) in a plurality of different positions, and the first guide means (16) between the first plug socket (10) and the electric motor (14) being flexible in the axial direction of the electric motor (14); and
second guide means (17) for electrically connecting the second plug socket (11) to the displacement-detecting means (9).

2. Outside rearview mirror, as claimed in claim 1, wherein the different positions between the two plug sockets (10, 11) are defined by means of teeth (25), provided between two parts of the drive housing.

3. Outside rearview mirror, as claimed in claim 1, wherein the drive housing (8) has a third part (22), and wherein the first drive housing part (20) rests against the third drive housing part (22) by means of rim gear teeth (25) and is thus guaranteed not to rotate.

4. Outside rearview mirror, as claimed in claim 1, wherein the drive housing (8) has a third part (22), and wherein the mirror further comprises snap-on means for holding the first drive housing part (20) at the third drive housing part (22), wherein the snap-on means is snappable on any arbitrary place about the drive housing.

5. Outside rearview mirror, as claimed in claim 1, wherein the drive housing (8) further comprises a third part (22) and a fourth part (23), whereby the first drive housing part (20) is one piece with the first plug socket (10), the second drive housing part (21) is one piece with the second plug socket (11), and the fourth drive housing part (23) is connected to the first drive housing part (20) by means of a slide connection (24).

6. Outside rearview mirror, as claimed in claim 1, wherein the drive housing further comprises a third part (22), and the mirror further comprises snap-on means (19) for holding the second drive housing part (21) at the third drive housing part (22).

7. Outside rearview mirror, as claimed in claim 1, wherein the drive housing further comprises a third part (22) and a fourth part (23), wherein the fourth drive housing part (23) engages with the third drive housing part (22) by means of rim gear teeth (25).

8. Outside rearview mirror, as claimed in claim 1, wherein the drive housing further comprises a third part (22) and a fourth part (23) and the mirror further comprises snap-on means (18) holding the fourth drive housing part (23) at the third drive housing part (22).

9. Outside rearview mirror, as claimed in claim 1, wherein the connections between the guide means (16, 17) and the electric motor (14) or the displacement-detecting means (9) are clamping joints.

10. Outside rearview mirror, as claimed in claim 1, wherein the displacement-detecting means (9) are a microswitch.

11. Outside rearview mirror, as claimed in claim 1, wherein the first and the second plug socket (10, 11) are designed in such a manner that they are connectable to identical connecting plugs.

12. Outside rearview mirror, as claimed in claim 11, wherein only one allocation is possible owing to the shape of the plug sockets (10, 11) and the related connecting plugs.

13. Outside rearview mirror, as claimed in claim 1, wherein each plug socket (10, 11) exhibits two connecting pins.

14. Outside rearview mirror, as claimed in claim 1, wherein the plugging direction of the first plug socket (10) runs at right angles to the plugging direction of the second plug socket (11).

15. Outside rearview mirror, as claimed in claim 1, wherein the plugging direction of the first plug socket (10) runs at right angles to the motor axis of the electric motor (14).

16. Outside rearview mirror, as claimed in claim 1, wherein the plugging direction of the second plug socket (11) runs parallel or antiparallel to the motor axis of the electric motor (14).

17. Outside rearview mirror, as claimed in claim 1, wherein the motor axis of the electric motor (14) runs parallel to the swivel axis of the outside rearview mirror.

18. Outside rearview mirror, as claimed in claim 1, wherein the displacement-detecting means (9) are held in the drive housing (8) so as to be locked by their shape in a force fit.

* * * * *